Figure 1:
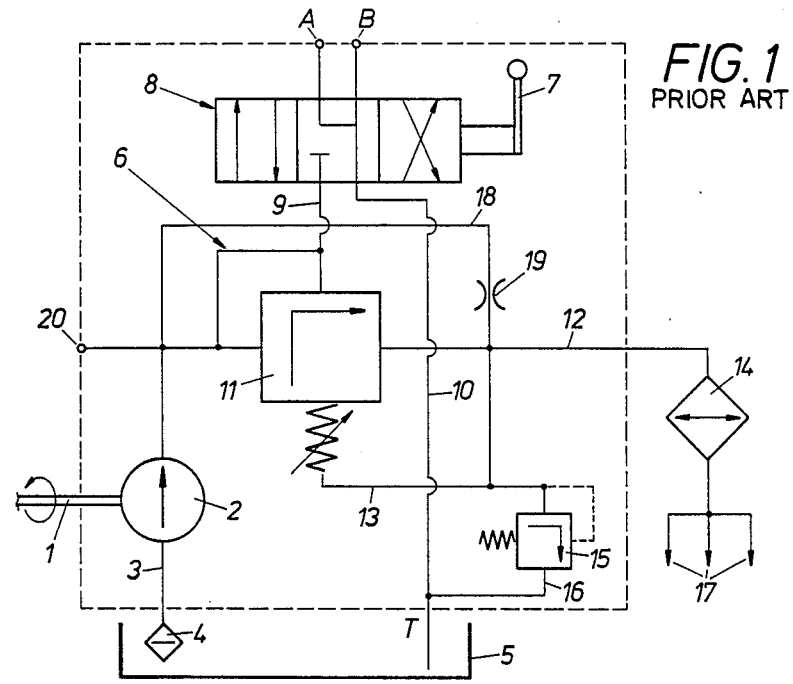

United States Patent [19]

Gerl

[11] Patent Number: 4,895,182
[45] Date of Patent: Jan. 23, 1990

[54] HYDRAULIC CONTROL UNIT
[75] Inventor: Maximilian Gerl, Peiting, Fed. Rep. of Germany
[73] Assignee: Hoerbiger Hydraulik GmbH, Schongau, Fed. Rep. of Germany
[21] Appl. No.: 292,334
[22] Filed: Dec. 30, 1988
[30] Foreign Application Priority Data Jan. 11, 1988 [AT] Austria .................................... 35/88

[51] Int. Cl.⁴ ...................... F15B 13/06; F16D 25/11
[52] U.S. Cl. .............................. 137/596.12; 192/87.19
[58] Field of Search ................. 137/596.12; 192/87.19

[56] References Cited

U.S. PATENT DOCUMENTS

| | | | |
|---|---|---|---|
| 3,391,767 | 7/1968 | Stow | 192/87.19 |
| 3,752,281 | 8/1973 | Arnold | 192/87.19 |
| 3,780,762 | 12/1973 | Matthews et al. | 192/87.19 X |
| 3,823,801 | 7/1974 | Arnold | 192/87.19 |
| 3,938,637 | 2/1976 | Murakami | 192/87.19 X |
| 3,991,787 | 11/1976 | Schmitt et al. | 137/596.13 |
| 4,611,621 | 9/1986 | Miyakawa et al. | 137/115 |

Primary Examiner—Gerald A. Michalsky
Attorney, Agent, or Firm—Watson, Cole, Grindle & Watson

[57] ABSTRACT

A hydraulic control unit, particularly for switching-over a boat reversing gear comprises a pump unit (2) fed by a tank (5), a switchable rotary slide valve combination (8) connecting two control junctions (A, B) either to the working pressure system or to the tank (5), and a working pressure relief valve (11). The discharge (12) from the working pressure relief valve (11) is fed to a cooler (14) with after-connected lubrication points. In order to prevent fluctuation of the pressure controlled by the working pressure relief valve (11) as a result of retroaction from the lubricating system or cooler (14), the spring compartment (33) of the working pressure relief valve (11) is connected to the tank (5). To control the lubrication pressure, a lubrication pressure relief valve (15) is connected between the cooler (14) and the lubrication points, and relieves into the tank (5).

1 Claim, 2 Drawing Sheets

HYDRAULIC CONTROL UNIT

SUMMARY OF THE INVENTION

The invention relates to a hydraulic control unit, particularly for switching-over a boat reversing gear, comprising a pump unit feeding a working pressure system from a tank, a switchable rotary slide valve combination by which two control junctions can be connected either to the working pressure system or to the tank, and an working pressure relief valve, the spring compartment of which is connected to the hydraulic circuit external to the working pressure system, and to the discharge side of which there are connected a cooler, at least one lubrication point and a lubrication pressure relief valve.

Such units are known and allow simple and smooth change-over between two or three switching positions, including in other applications than the stated boat reversing gear. In the operationally most outer switching positions one of the control junctions is selectively exposed to the working pressure and the other respective junction is connected to the tank, whereas in a middle position either both or only one of the control junctions can be connected to the tank, so that for example in the case of the said boat reversing gear a no-load running position is obtained in which the drive motor is separated from the propeller and can be shut down or started up independently thereof.

In a known unit of the state type, the spring compartment of the working pressure relief valve is connected to the hydraulic line which extends from this latter to the cooler provided with the lubrication points, and from which at the same time there also branches the connection for the lubrication pressure relief valve, this latter relieving freely into the tank or into a compartment connected thereto when its set pressure is exceeded. By this means there is the immediate drawback that particularly in the case of a pump unit directly speed-coupled to a machine or the like to be lubricated, when it rotates at high speed a large quantity of hydraulic oil is continuously relieved through the lubrication pressure relief valve before passing through the cooler.

The object of the present invention is to provide a hydraulic control unit of the initially state type by which the said drawback of the known construction is obviated and in particular which ensures that the by-passing of the cooler by the premature relieving of a large proportion of the circulating hydraulic medium into the tank is stopped by simple means and without any additional or other drawbacks arising.

In this connection it might well be thought possible to simply connect the relief line from the lubrication pressure relief valve into the line after the cooler and before the lubrication points, as in any event all the hydraulic medium relieved by the working pressure relief valve is compelled to pass through the cooler. However, in this case the serious drawback immediately arises that the pressure in the spring compartment of the working pressure relief valve, which is already substantially influenced by the actual working pressure of the control unit, is dependent on the back-pressure of the cooler circuit and on the lubrication pressure, which for their part are temperature and viscosity-dependent and therefore dependent on throughput, so that very different working pressures can develop between low and high temperature and between low and high pump speed.

The stated object is attained by the present invention, which also obviates the latter drawback, in that the spring compartment of the working pressure relief valve is connected to the tank such that it is at the same pressure thereas, and the lubrication pressure relief valve is connected between the cooler and the lubrication points. Thus in a very simple manner the pressure in the spring compartment of the working pressure relief valve is made independent of the state influences, the tank contents being at atmospheric pressure for normal uses of such control units and subject to negligible fluctuations. The arrangement according to the invention therefore ensures that the total quantity of hydraulic medium relieved by the working pressure relief valve to the pressure lubrication system goes through the cooler before being deviated to the lubrication pressure relief valve without any repercussions on the working pressure itself.

The invention is described in detail hereinafter with reference to the embodiment shown on the drawing.

Figure 2:
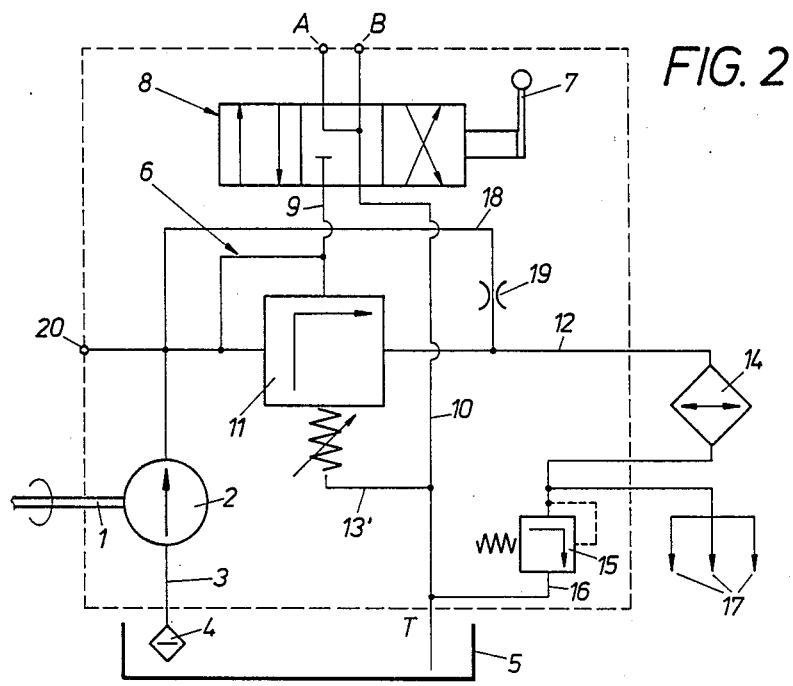
Figure 3:
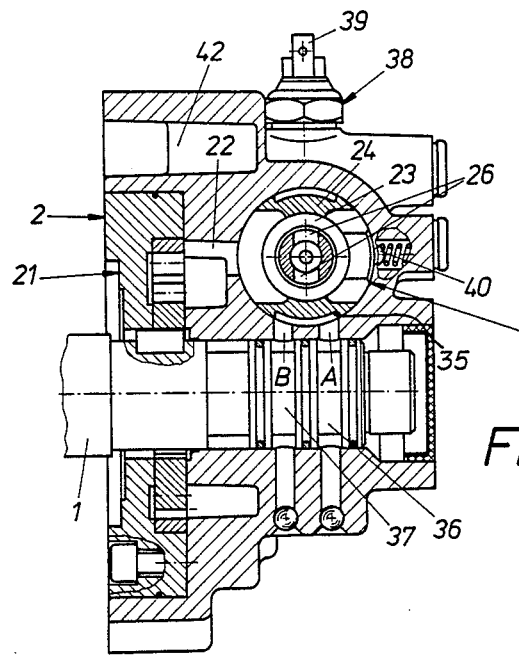
Figure 4:
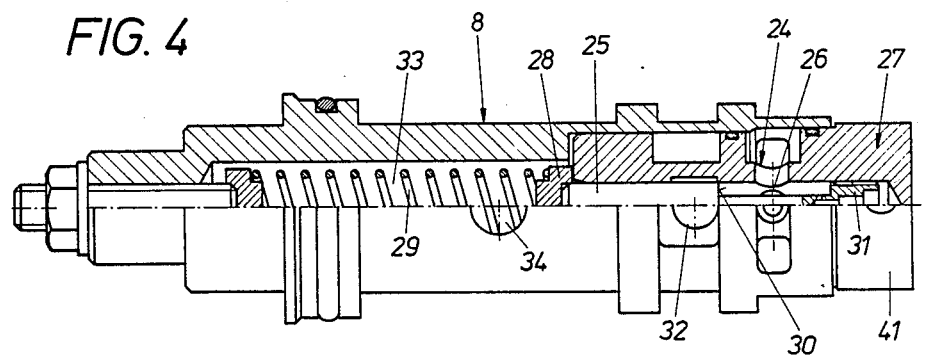

FIG. 1 is a diagrammatic circuit diagram of a hydraulic control unit of the state of the art, FIG. 2 shows a corresponding unit according to the invention, FIG. 3 is a cross-section through a further practical embodiment of the control unit according to the invention, and FIG. 4 shows a rotary slide valve combination of FIG. 3 to a somewhat enlarged scale.

The hydraulic control unit corresponding to the state of the art shown in the schematic circuit diagram of FIG. 1 is used for example to engage or switch-over a boat reversing gear, not shown in detail, which comprises clutches for the two possible directions of rotation of a ship's propeller and which are connected to the junctions A and B. The structure and the description of the construction of such a boat reversing gear is unimportant in connection with the present invention and will therefore be dispensed with, the hydraulic control unit of FIG. 1 and the embodiment of the invention shown in FIG. 2 being also usable for other control or switching purposes.

A pump unit 2 driven by a shaft 1 delivers hydraulic oil or medium from a tank 5 through a suction line 3 fitted with an initial filter 4 and into a working pressure system indicated overall by 6. The two control junctions A and B can be connected either to the working pressure system 6 by way of the line 9 or to the tank 5 by way of the line 10 using a rotary slide valve combination 8 which can be switched-over by a lever 7.

A working pressure relief valve 11 is associated with the working pressure system 6 to relive hydraulic medium through a line 12 in known manner when a set pressure is exceeded. The spring compartment of the relief valve 11 is connected on the one hand by a line 13 to the line 12 leading to the cooler 14, and on the other hand to a lubrication pressure relief valve 15, the discharge 16 from which opens into the line leading to the tank 5 and which is used to limit or keep constant the lubrication pressure in the line 12 leading to the cooler 14 or to the subsequent lubrication points 17.

For completeness of description, a by-pass line 18 with a basic lubrication throttle 19 is provided to ensure a certain lubrication of the lubrication points 17 even when the pressure is below the relief pressure of the relief valve 11. Finally, the reference numeral 20 represents a possible measuring point for the working pressure.

In the middle position of the rotary slide valve 8 shown in FIG. 1, the two junctions A and B are connected by the line 10 to the tank 5 and are at the same pressure level thereas, so that for example when used on a boat reversing gear both clutches would be inactivated, corresponding to no-load running of the propeller shaft. On switching the rotary slide valve 8 into either its indicated left hand or right hand end position, either the junction A or the junction B is exposed to the working pressure, the respective other junction being instead at the pressure level of the tank 5 by way of the line 10.

In the stated application for switching a boat reversing gear, the shaft 1 of the pump unit 2 is driven from the drive motor either directly or via a transmission shaft, the throughput of the pump unit being related directly to the speed of the drive motor. Thus with reference to the already mentioned connection between the discharge of the working pressure relief valve 11 and the lubrication pressure relief valve 15 there is the immediate drawback the particularly at high drive motor speeds and thus at large throughputs of the pump unit 2 a large proportion of the hydraulic medium relieved through the relief valve 11 is already deviated into the tank 5 through the relief valve 15 before the cooler 14. There are also certain influences on the pressure in the working pressure system 6 as the back pressure in the spring compartment of the relief valve 11 is influenced at least to a certain effect by retroactive effects of the flow through the cooler 14.

In the embodiment of the invention shown in FIG. 2, in which identical parts or parts of identical function carry the same reference numerals as in FIG. 1, the stated drawbacks are obviated in a very simple and effective manner in that the line 13' from the spring compartment of the working pressure relief valve 11 is connected to the line 10 which leads to the tank 5, by which means the back pressure in the spring compartment of the relief valve 11 is made independent of retroactive effects of the cooler 14 or of the lubrication points 17. Moreover, the lubrication pressure relief valve 15 is located downstream of the cooler 14 so that the total hydraulic medium relieved by the relief valve 11 has to pass through the cooler 14. Thus by means of the embodiment of the invention shown in FIG. 2, the total hydraulic medium deviated by the working pressure relief valve 11 for lubrication purposes is able very simple means to pass through the cooler 14 without any undesirable influences on the pressure of the hydraulic medium in the actual working pressure system being able to arise.

With regard to further characteristics and to the method of operation of the circuit shown in FIG. 2, reference should be made to FIG. 1 to avoid repeating the aforegoing description. The practical embodiment of the hydraulic control unit shown in FIG. 3 comprises, on a shaft 1 (here and hereinafter those components corresponding functionally to the circuit elements of FIGS. 1 and 2 carry the same reference numerals as in the two said figures, and with regard to the construction and operation of the arrangement shown in FIGS. 3 and 4 and described hereinafter reference should be again made for completeness to the aforegoing descriptions relative to FIGS. 1 and 2), the pump unit 2 which in this case is in the form of an internal gear pump 21 and delivers pressurised medium into the open inner compartment 23 of the control part 24 of the rotary slide valve combination 8 by way of a connection opening 22. The relieving piston 25 which is urged axially by a valve spring 29 by way of a spring washer 28 against a shoulder surface 30 is exposed to the pressure in the connection opening 22 by way of holes 26 in the pressure relief valve housing 27 (see also FIG. 4), the end guide 31 of the relieving piston 25 shown on the right hand side of FIG. 4 obviously being provided with corresponding through slots or the like. As soon as the pressure of the hydraulic medium fed by the pump unit 2 exceeds at the side of the shoulder surface 30 a value determined by the strength of the valve spring 29 and the size of the shoulder surface 30, the relieving piston 25 moves to the left with reference to FIG. 4, to relieve to the cooler, not shown, by way of the outlet 32 (or the line 12 in FIG. 2). The spring compartment 33 is connected to the total system and to the tank by way of an opening 34 (or the lines 13' and 10 in FIG. 2), so that the back pressure acting on the relieving piston 25 from the side comprising the spring washer 28 is independent of retroactive effects of the type described with reference to FIG. 1. In FIG. 4, the lubrication pressure relief valve is shown incorpoated into the left hand side of the rotary slide valve combination 8, but is not shown in detail either in FIG. 4 or in FIG. 3. It lies outside the sectional plane of FIG. 3 in the compartment indicated by 42 at the top of the unit.

In the switching position of the rotary slide valve 8 shown in FIG. 3 the two junctions A and B are connected to the tank through a circumferential slot 35, which penetrates axially in a manner not shown as far as the annular space surrounding the opening 34, this switching position corresponding to the middle position shown in FIGS. 1 and 2. On turning the rotary slide valve 8 or the control part 24 (clockwise or anticlockwise in FIG. 3), one of the two junctions A and B becomes connected to the inner compartment 23 and therefore to the working pressure system, whereas the respective other junction remains connected to the tank. By way of annular spaces 36, 37 and axial bores extending from these latter leftwards (with reference to FIG. 3) through the shaft 1, the respective switching commands are transmitted through the rotating shaft 1 and to the units which are to be controlled, not shown, for example the clutches of the boat reversing gear.

In FIG. 3 there is shown at the top a touch contact switch 38 and corresponding connector 39, perpendicularly acting on or responsive to the end of the pressure relief valve housing 27 or a marker or the like fitted thereto. This serves to determine or remotely indicate at least one of the switching positions of the rotary slide valve, normally the neutral or middle position. 90° displaced from the posititon of the touch contact switch 38 there can be seen on the right hand side of FIG. 3 a spring-loaded stop ball 40 which in cooperation with correspondingly shaped notches provided for example in the cap part 41 shown on the far right of FIG. 1 simplifies the location and maintaining of determined switching positions of the rotary slide valve. The pressure relief valve housing 27 and the relieving piston 25 can for example be of steel construction, whereas the remaining housing parts of the rotary slide valve combination 8 shown in FIG. 4 can be of less resistant and more easily machineable material such as aluminium or light-alloy diecasting metal.

What is claimed is:

1. A hydraulic control unit, particularly for switching-over a boat reversing gear, comprising a pump unit feeding a working pressure system from a tank, a switchable rotary slide valve combination by which two control junctions can be connected either to the working pressure system or to the tank, a working pressure relief valve having a spring compartment which is connected to a hydraulic circuit external to the working pressure system and a discharge side which is connected to a cooler, at least one lubrication point and a lubrication pressure relief valve, characterised in that the spring compartment of the working pressure relief valve is connected to the tank such that it is at the same pressure thereas, and the lubrication point is connected between the cooler and the lubrication pressure relief valve.

* * * * *